No. 686,937. Patented Nov. 19, 1901.
G. HEINE.
COUPLING FOR TRANSMISSION OF POWER.
(Application filed Dec. 6, 1900.)
(No Model.)

UNITED STATES PATENT OFFICE.

GEORG HEINE, OF VIERSEN, GERMANY.

COUPLING FOR TRANSMISSION OF POWER.

SPECIFICATION forming part of Letters Patent No. 686,937, dated November 19, 1901.

Application filed December 6, 1900. Serial No. 38,899. (No model.)

*To all whom it may concern:*

Be it known that I, GEORG HEINE, manufacturer, a subject of the Emperor of Germany, and a resident of Viersen, Rhineland, in the Kingdom of Prussia and Empire of Germany, have invented a new and useful Coupling for Transmission of Power, of which the following is a specification.

The object of this invention is to provide a coupling for transmitting power from a driving to a driven part through the medium of a fluid in such a manner as to maintain an elastic connection that will not transmit from the motor shocks resulting from any irregularity of speed in said motor or transmit to the motor any injurious reaction resulting from the throwing in or out of gear of any machine that is to be operated.

A further object is to provide means for transforming an inconstant revolution of a driving-shaft into a constant revolution of the part that is driven.

A further object is to provide an automatic speed-regulator in such a coupling.

By my invention wear and tear of the rotating parts will be reduced to a minimum, because no rigid part acts upon any other, but such rigid parts come into contact only with a fluid.

The annexed drawings show one practical embodiment of the coupling forming the subject of my invention, in which—

Figure 1:
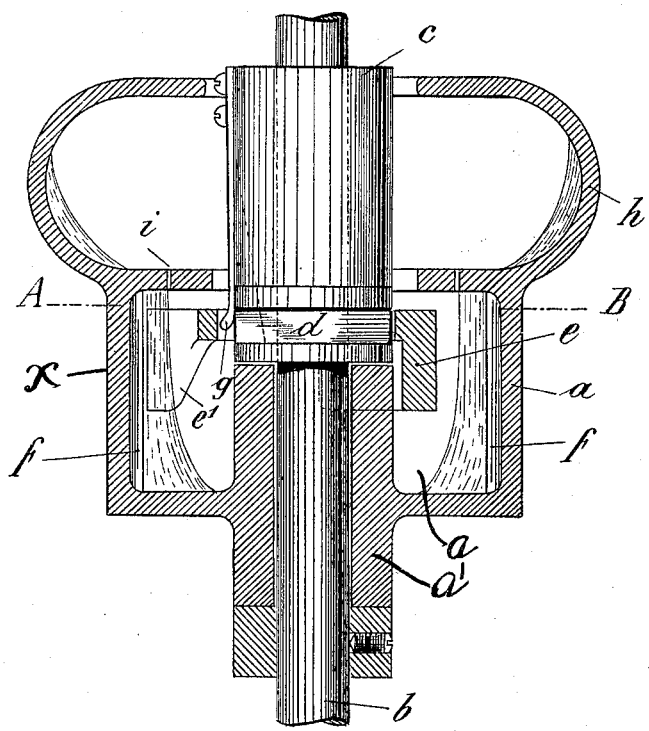
Figure 2:
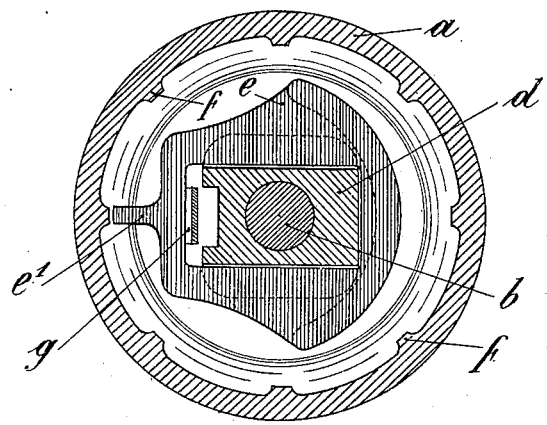

Figure 1 is a longitudinal section of the coupling; and Fig. 2, a cross-section on the line A B, Fig. 1.

The shaft $b$, which is to be driven, fits in a sleeve $c$, formed at a suitable point in its length with a transverse guide $d$, upon which is mounted a radially-movable but not relatively rotatable dog $e$, formed on one side with a wing $e'$. Inclosing the dog $e$ and concentric with its sleeve is a chamber $a$ of the coupling-cylinder $x$, which has a turning bearing $a'$ on the shaft $b$. The chamber $a$ is supplied with a fluid, and this fluid when the coupling is set in motion is driven by centrifugal force against the exterior wall of the chamber $a$, as shown by the drawings. Beyond the chamber $a$ is a chamber $h$, into which the superfluous fluid may enter through the openings $i$. When the coupling comes to rest, the fluid in chamber $h$ returns to the chamber $a$. Ribs $f$ on the inner wall of the chamber $a$ gradually force the fluid to follow the rotating movement of the coupling and to eventually assume the same speed. Wing $e'$ of the dog $e$ projects into the revolving annulus of the fluid, and the latter exerts a pressure on the dog that imparts to the latter gradually a rotary movement which will gradually increase in speed. Since the dog $e$ is fixed against rotation on the sleeve $c$, which is fixed on the shaft $b$, rotation of the latter is set up; but the driving connection between the shaft $b$ and the coupling-cylinder $x$ is entirely through the medium of the fluid, which is not confined, and said connection is therefore made through elastic medium, which prevents any shocks being transmitted from the machine that is connected with the shaft $b$ back through the coupling to the motor, and vice versa—that is to say, the resistance of the driven machine is only overcome gradually by the elastic coupling, so that momentary fluctuations will not be transmitted and no shock can result from throwing in a machine. If the driving power is poorly regulated and imparts irregular rotations, the shaft driven by the elastic coupling will still be driven with a constant rotation, because its inertia will cause the coupling to yield instead of transmitting sudden changes. With this coupling all friction between rigid parts disappears completely, thus diminishing to a minimum the wear and tear.

In the practical example shown the dog $e$ is movable on the shaft $b$ sufficiently to partially or wholly withdraw its wings $e'$ from the annulus of fluid. A spring $g$ is arranged in such a manner that it projects the wing normally into the fluid; but should the speed of rotation increase beyond a predetermined limit centrifugal force will move the dog in opposition to the pressure of the spring, the side of the dog opposite to the wing being made of enlarged bulk, thereby providing a centrifugal counterpoise, so that its action will cause the wing $e'$ to gradually withdraw from the fluid. On reaching the maximum speed the catch-wing $e'$ would be drawn so far out of the fluid as to arrest the driven parts; but since gradual withdrawal effects a corresponding reduction in the propelling effect of the fluid the desired speed of the driven parts is maintained. The coupling thus constitutes an effective governor not by introducing a braking force with consequent loss of energy, but by reducing the degree of energy transmitted.

Obviously a plurality of radial dogs could be employed, as this would simply be multiplying this element of the device.

The coupling can be used either vertically or horizontally, since the fluid remaining in the chamber $a$ would be quite sufficient to provide the revolving fluid annulus, the surplus flowing by gravity through openings $i$ instead of by centrifugal force, as when the coupling is in vertical position.

In its broadest scope my invention is not limited to the radial adjustability of the dog, as this feature has to do more particularly to the incident of governing the transmission of the driving power.

Having thus described my invention, the following is what I claim as new therein and desire to secure by Letters Patent:

1. A coupling for transmission of power comprising a rotating driving member formed with a fluid-chamber with a space containing a quantity of fluid which, when the driving member rotates, forms into a revolving fluid annulus and a driven member having a radial wing projecting into the fluid annulus for the purpose set forth.

2. A coupling for the transmission of power comprising a rotating driving member formed with a fluid-chamber having an end opening through which fluid above a determined amount will escape whereby the fluid remaining therein will form under centrifugal force into a revolving annulus in said chamber, and a rotating driven member having a wing projecting radially into the space of the fluid annulus.

3. A coupling for transmission of power comprising a rotating driving member having an axially open circular chamber with inwardly-projecting ribs leaving a free annular space entirely around said chamber within the inner ends of said ribs and a rotating driven member having a wing projecting into and rotatable within the said free annular space within the ribs whereby fluid placed in the chamber forms an annulus under centrifugal force, and engages the wing for the purpose set forth.

4. A coupling for transmission of power comprising a rotating driving member provided with a chamber having an axial opening in which a restricted quantity of fluid is retained and forms a revolving annulus under centrifugal force, a rotating driven member, and a wing projecting radially from said driven member into the space of said fluid annulus, radially movable on said driven member whereby it may withdraw from said annulus, and provided with a centrifugal counterpoise for withdrawing the wing under abnormal revolution of the driven member.

5. A coupling for transmission of power comprising the rotating driving member provided with a chamber $a$ and a chamber $h$ with which the chamber $a$ communicates through an end opening $i$, and a rotating driven member projecting into said chamber $a$, and having a wing $e'$, extending radially into the space of chamber $a$ for the purpose set forth.

6. A coupling for the transmission of power comprising a rotating driving member provided with a chamber in which fluid forms a revolving annulus under centrifugal force, a rotating driven member extending axially into said chamber, a dog radially movable but non-rotatable on said driven member, provided with a wing, a spring normally projecting the wing into the space of the fluid annulus and a centrifugal counterpoise on said dog opposing said spring.

7. A coupling for transmission of rotary power comprising a sleeve to be fixed to a driven member, formed with a transverse seat, a dog radially movable but non-rotatable on said seat, carrying a radial wing and centrifugally counterpoised on its side opposite said wing, a spring normally projecting said wing, and a rotating driving member provided with a chamber concentric with the driven sleeve and inclosing said dog and wing and a second chamber communicating with the chamber first named, for the purposes set forth.

In witness whereof I have hereunto set my hand in presence of two witnesses.

GEORG HEINE.

Witnesses:
J. ERKENS,
WM. B. PHELPS.